United States Patent

Gioutsos et al.

[11] Patent Number: 5,490,069
[45] Date of Patent: Feb. 6, 1996

[54] MULTIPLE-STRATEGY CRASH DISCRIMINATION SYSTEM

[75] Inventors: Tony Gioutsos, Brighton; Edward J. Gillis, Canton, both of Mich.

[73] Assignee: Automotive Systems Laboratory, Inc., Farmington Hills, Mich.

[21] Appl. No.: 181,616

[22] Filed: Jan. 14, 1994

Related U.S. Application Data

[63] Continuation-in-part of Ser. No. 48,366, Apr. 15, 1993, Pat. No. 5,446,661.

[51] Int. Cl.$^6$ ................................................ B60R 21/32
[52] U.S. Cl. .................. 364/424.05; 340/436; 307/10.1; 280/735; 180/282
[58] Field of Search ................. 364/424.05; 280/735; 307/10.1; 180/268, 282; 340/436, 438

[56] References Cited

U.S. PATENT DOCUMENTS

| | | | |
|---|---|---|---|
| 4,620,721 | 11/1986 | Scholz et al. | 280/735 |
| 4,625,329 | 11/1986 | Ishikawa et al. | 382/1 |
| 4,827,091 | 5/1989 | Behr | 200/61.45 |
| 4,985,835 | 1/1991 | Sterler et al. | 364/424.05 |
| 4,994,972 | 2/1991 | Diller | 364/424.05 |
| 5,014,810 | 5/1991 | Mattes et al. | 180/268 |
| 5,040,118 | 8/1981 | Diller | 364/424.05 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,157,268 | 10/1992 | Spies et al. | 307/10.1 |
| 5,161,820 | 11/1992 | Vollmer | 280/735 |
| 5,164,901 | 11/1992 | Blackburn et al. | 364/424.05 |
| 5,173,614 | 12/1992 | Woehrl et al. | 307/10.1 |
| 5,186,494 | 2/1993 | Shimose | 280/806 |
| 5,229,943 | 7/1993 | Eigler et al. | 364/424.05 |
| 5,232,243 | 8/1993 | Blackburn et al. | 280/735 |
| 5,256,904 | 10/1993 | Tohbaru | 307/10.1 |
| 5,330,226 | 7/1994 | Gentry et al. | 280/735 |

*Primary Examiner*—Kevin J. Teska
*Assistant Examiner*—Tyrone V. Walker
*Attorney, Agent, or Firm*—Lyman R. Lyon

[57] ABSTRACT

A system (10) and method for actuating a vehicle air bag (38) uses an optical detector (12) to generate an output (22) representative of the distance between a vehicle occupant and a fixed structure within the vehicle. The output (22) is subsequently used by a signal processor/discrimination unit (26) to generate data representative of actual occupant conditions, such as transitory occupant position, velocity and/or acceleration. The occupant condition data is used to select the temporally optimal one of a plurality of different predetermined parameter-based crash discrimination strategies (R,S,T,X,Y,Z), and perhaps further used as a decisional criterion in at least one strategy. Each strategy employs different decisional criteria to provide a different range of actual times to fire. The different decisional criteria of the available strategies may be the result of uniquely-different parameter-based crash discrimination algorithms, or otherwise-identical parameter-based algorithms employing different thresholds, or both. The air bag is actuated when the decisional criteria of the selected strategy are satisfied to generate an actual time to fire. The present system and method thus optimize crash discrimination analysis by customizing the analysis in real time to match actual rather than assumed occupant conditions.

14 Claims, 6 Drawing Sheets

MULTIPLE-STRATEGY CRASH DISCRIMINATION SYSTEM

CROSS-REFERENCE TO RELATED APPLICATIONS

The instant application is a continuation-in-part of U.S. patent application Ser. No. 08/048,366, now U.S. Pat. No. 5,446,661, filed Apr. 15, 1993, entitled "Adjustable Crash Discrimination System with Occupant Position Detection," and assigned to the assignee of the present invention.

BACKGROUND OF THE INVENTION

The present invention relates to motor vehicle crash discrimination systems utilized for actuating or deploying a passenger safety restraint, and more specifically to a system and a method for actuating a passenger safety restraint which utilizes detected occupant position to achieve improved functionality and reliability.

Conventional vehicle crash discrimination systems typically employ at least one acceleration sensor affixed to the vehicle for sensing vehicle acceleration. The sensor's output is supplied to a crash discrimination circuit which determines at least one crash measure, such as a value for vehicle velocity through integration of the sensor's output over time, for subsequent comparison to a predetermined threshold value. If the predetermined threshold value is exceeded, the discrimination circuit outputs a trigger signal which actuates or deploys a passenger safety restraint, such as an air bag or passive seat belt pretensioning mechanism.

The time at which such an accelerometer-based crash discrimination circuit actually generates this trigger signal, relative to the beginning of the crash, is known as the "actual time to fire;" and a given accelerometer-based crash discrimination circuit inherently provides a range of such actual times to fire, as generally determined by the profile of the crash experienced by the vehicle (sometimes referred to as "crash type"). Specifically, in the above example, since the relative amount of time required in order for the velocity value (integrated acceleration) to exceed the threshold value necessarily depends upon the individual values for acceleration data generated by the sensor, and since a severe crash type is likely to generate higher individual acceleration values than those generated by a moderate crash type, a given accelerometer-based crash discrimination circuit is inherently capable of generating the trigger signal over a range of times relative to the beginning of the crash.

One failing of such conventional accelerometer-based crash discrimination systems is that they fail to account for variations in vehicle passenger/occupant conditions (whether static or dynamic) in determining whether to actuate the safety restraint, particularly as these variations affect the amount of time otherwise available for crash discrimination while still permitting safe and complete actuation/deployment of the safety restraint. This maximum amount of time for crash discrimination analysis, as measured from the beginning of a crash, is the "required time to fire" of the safety restraint. More specifically, conventional accelerometer-based crash discrimination systems are generally designed to assume a set of "nominal" occupant conditions, such as the presence within the vehicle of a 50th-percentile male occupant and the failure of such an occupant to wear a seat belt, as well as a fixed required time to fire.

The use of these assumed "nominal" conditions by known crash discrimination systems tends to ensure proper actuation of the safety restraint only to the extent that they accurately describe the actual occupant conditions at the time at which severe vehicle acceleration (deceleration) is detected by the accelerometer. Correlatively, the use of this single set of assumptions, with its attendant required time to fire, inherently causes unnecessary, ill-timed, or perhaps even undesired actuation of the safety restraint where the assumed conditions are not otherwise met by the occupant at the time the accelerometer indicates severe vehicle acceleration, as when there is no occupant present within the vehicle; or when the occupant is not a 50th-percentile male; or in marginal crash situations where a seat belt otherwise provides sufficient safety protection for the occupant; or in crash situations where the occupant is improperly positioned relative to the safety restraint such that actuation of the safety restraint could itself injure the occupant. Moreover, where the vehicle occupant to be protected is a front-seat passenger rather than the vehicle's driver, many additional occupant condition scenarios are raised, such as that of a child moving around in the seat at the start of a crash; or a child moving into the front passenger seat from a rear seat as a crash begins; or a rear-facing infant seat positioned only a few inches away from the point of deployment of the safety restraint; or an adult bending over to pick something up off the vehicle floor as a crash begins; or a passenger holding a heavy object near the deployment point; or a parent holding a child on her lap. Finally, to the extent that actual occupant conditions indicate a longer required time to fire, such prior art crash discrimination systems fail to utilize that additional time for increased decisional reliability, let alone the additional acceleration information generated during that additional time.

Another known vehicle crash discrimination system disclosed in U.S. Pat. No. 5,118,134 to Mattes et al utilizes both sensed vehicle acceleration and the occupant's transitory displacement from a nominal seating position in determining whether to actuate a safety restraint. A further embodiment uses sensed transitory occupant velocity, as measured by the relative change in detected occupant displacement over time, as a third trigger criterion. The relative occupant displacement and/or transitory occupant velocity is measured using ultrasonic, light or microwave signals as transmitted between fixed transmitters and receivers mounted either longitudinally or transversely of the vehicle, with the latter configuration providing an indication of occupant displacement from his nominal position as he "breaks" each one of several planes defined by the transducers within the passenger compartment. In the preferred embodiment, the system compares the present-sensed vehicle acceleration to a first threshold value, the relative displacement of the occupant from his nominal position to a second threshold value, and the relative velocity of the occupant to a third threshold value. The safety restraint is actuated when the first threshold value and either one of the second or third threshold values are simultaneously exceeded.

While the system disclosed in U.S. Pat. No. 5,118,134 to Mattes et al improves reliability over conventional accelerometer-based crash discrimination system through its use of displacement of an occupant from his nominal position and, perhaps, of transitory occupant velocity information derived from such occupant displacement, the system remains relatively rigid due to its reliance upon but a single set of decisional criteria (the predetermined threshold values for vehicle acceleration, occupant displacement from nominal and transitory occupant velocity), as well as the use in the preferred disclosed embodiment of relatively low-resolution, noncontinuous occupant position information obtained with the primary "break-the-plane" transducer configuration. Stated another way, while the arrangement of Mattes et al attempts to accommodate gross displacement of the occupant from his nominal seating position by making such displacement an additional trigger criterion, the system does not otherwise accommodate various deviations from assumed nominal conditions, including volitional occupant movement, which affect the manner in which other trigger criteria are best utilized for crash discrimination analysis.

SUMMARY OF THE INVENTION

It is an object of the present invention to provide a system and method for vehicle crash discrimination which uses data representative of actual occupant conditions to optimize its crash discrimination analysis, thereby achieving increased efficiency and reliability in controlling actuation of a vehicle safety restraint such as an air bag.

It is another object of the present invention to provide a system and method for vehicle crash discrimination which features multiple crash discrimination strategies to optimize safety restraint efficiency and reliability.

It is another object of the present invention to provide a system and method for vehicle crash discrimination which utilizes multiple crash discrimination strategies, each of which provides a different range of actual times to fire.

A further object of the present invention is to provide a system and method for vehicle crash discrimination featuring multiple crash discrimination strategies, at least one of which uses the detected distance from occupant to fixed vehicle interior structure in determining an actual time to fire.

It is another object of the present invention to provide a system and method for vehicle crash discrimination which uses occupant position information to select a preferred one of a plurality of predetermined crash discrimination strategies to achieve increased efficiency and reliability in actuating a safety restraint.

It is another object of the present invention to provide a system and method for discriminating vehicle crashes which adjusts the decisional criteria used for determining an actual time to fire based on the detected distance between the occupant and a potential impact point within the vehicle, or based on occupant condition data (itself derived from detected distance).

It is another object of the present invention to provide a system and method for discriminating vehicle crashes which determines the distance between a vehicle occupant and a potential impact point within the vehicle, and utilizes this information both for selecting the optimal discrimination strategy and as an additional criterion used by the selected strategy in determining an actual time to fire.

It is yet another object of the present invention to provide a system and method for discriminating vehicle crashes which utilizes an optical low-threshold acceleration sensor to calibrate an optical occupant-position sensing means, to discriminate irrelevant occupant movement from movement caused by crash situations, and to generate an output signal representative of vehicle acceleration.

Under the present invention, a system for actuating a vehicle safety restraint comprises means for detecting a distance between a vehicle occupant and a fixed structure within the vehicle; means responsive to the detecting means for generating occupant condition data representative of transitory occupant position, transitory occupant velocity and/or transitory occupant acceleration; and means for receiving information representative of instantaneous vehicle acceleration. The present system further comprises processor means responsive to the detected distance and the received vehicle acceleration information for determining a first actual time to fire with which to control actuation of the safety restraint. Specifically, the processor means continuously generates occupant condition data based on the detected distance, with the occupant condition data being representative of at least one of the group consisting of transitory occupant position, transitory occupant velocity and transitory occupant acceleration. The processor means further selects one of a plurality of crash discrimination strategies for use in a crash discrimination analysis based on the generated occupant condition data, with each of the crash discrimination strategies using received vehicle acceleration information to provide a range of actual times to fire, and with the range of actual times to fire provided by one of the strategies being different from the range of actual times to fire provided by another of the strategies. The processor means uses the selected strategy to determine the first actual time to fire needed for controlling actuation of the restraint. Finally, the present system includes means responsive to the processor means for actuating the safety restraint at the thus-determined first actual time to fire.

In accordance with the present invention, a method for actuating a vehicle occupant safety restraint comprises the steps of detecting a distance between a vehicle occupant and a fixed structure within the vehicle; generating occupant condition data based on the detected distance, where the generated occupant condition data is one of the group consisting of transitory occupant position, transitory occupant velocity and transitory occupant acceleration; receiving information representative of instantaneous vehicle acceleration; and selecting one of a plurality of crash discrimination strategies for use in a crash discrimination analysis based on generated occupant condition data, wherein each strategy uses received vehicle acceleration information to provide a range of actual times to fire, with the range of actual times to fire provided by one of the strategies being different from the range of actual times to fire provided by another of the strategies. The present method further comprises the steps of determining an actual time to fire in accordance with the selected strategy; and actuating the safety restraint at that actual time to fire. Through its selection of crash discrimination strategy based upon data representative of actual occupant conditions—whether the data is representative of a static occupant condition such as transitory occupant position, or a dynamic occupant condition such as transitory occupant velocity or transitory occupant acceleration—the present method correlatively adjusts the time period allotted for such crash discrimination analysis to provide additional time for discrimination analysis only when actual occupant conditions indicate that such additional time is available, and to use less time when actual occupant conditions indicate that a trigger decision is needed in a shorter time period after the commencement of a collision.

More specifically, under the present invention, the individual crash discrimination strategies utilize either uniquely-different parameter-based algorithms; identical parameter-based algorithms employing one or more dissimilar critical thresholds; or both. Thus, in one disclosed embodiment, the multiple strategies are defined using a single parameter-based algorithm employing at least one critical threshold which varies as a function of detected occupant distance. And, under the present invention, the detected occupant distance and/or the occupant condition data generated therefrom (i.e., transitory occupant position, velocity and/or acceleration) may be further used as decisional parameters in one or more crash discrimination strategies.

Accordingly, the present method may further include the steps of comparing the detected occupant distance to a first predetermined threshold value in at least one of the crash discrimination strategies, and determining an actual time to fire in accordance with that strategy only when and if the detected distance exceeds the first threshold value. Or the present method may include the steps of comparing generated data representative of transitory occupant velocity to a second predetermined threshold in accordance with one or more crash discrimination strategies, and determining an actual time to fire in accordance with that strategy only when and if the transitory occupant velocity exceeds the second threshold value. Or the present method may include the steps of comparing generated data representative of transitory occupant acceleration to a third predetermined threshold in accordance with one or more crash discrimination strategies, and determining an actual time to fire in accordance with that strategy only when and if the transitory occupant acceleration the transitory occupant acceleration exceeds the third threshold value. Finally, as noted above, the present method may include the additional steps of adjusting the second and third threshold values to which the data representative of transitory occupant velocity and transitory occupant acceleration are respectively compared based on the detected distance between the occupant and fixed vehicle structures, in real time. As noted above, the transitory occupant velocity and/or the transitory occupant acceleration are themselves dynamic occupant conditions and, hence, may further be used as criteria for selecting the crash discrimination strategy which provides the optimal protection for the occupant.

In accordance with the present invention, the generation of occupant condition data from detected distance increases the overall efficiency and reliability of the system by customizing the discrimination analysis in real time to match actual conditions of a vehicle occupant. Thus, the present invention contemplates relatively high-speed or essentially "continuous" analysis of actual occupant conditions, as exemplified by transitory relative occupant position within the vehicle, so that the optimal crash discrimination strategy is selected and, hence, will be employed at the time of the vehicle collision to provide maximum protection for vehicle occupants. Specifically, the distance between the occupant and fixed vehicle structure is detected by transmitting a beam of light at a designated area within the vehicle potentially occupied by a person, measuring a relative intensity level, or average of two scattering angles of at least a portion of the light beam which is reflectively scattered by a surface within the designated area, and determining the distance between the scattering surface and a fixed structure within the vehicle based on the measured intensity level. In a first embodiment, the distance is detected by measuring the intensity level of the reflectively scattered light beam received at two different locations separated by a predetermined distance, and determining the distance between the scattering surface and the fixed structure based on a ratio of the intensity levels measured at the two different locations.

In another embodiment, the distance between the scattering surface and the fixed structure is detected by transmitting the beam of light from a first location within the vehicle. A detector having a predetermined angle of light detection is positioned at a second location within the vehicle. The first and second locations are separated by a predetermined distance. The reflectively scattered light beam is focused by a lens to form a spot within the light detection area of the detector, wherein the location of the spot is indicative of the angle from which the light is received. The location of the spot within the light detection area is determined using a photosensitive device with a set of outputs that indicate spot position. The distance between the scattering surface and the fixed structure is then determined by the angle from which the light is received.

A further embodiment of the present invention utilizes an optical low-threshold safing sensor to provide calibration of the system, discern irrelevant occupant movement, and generate data representative of vehicle acceleration. At least a portion of the transmitted light beam is directed at a first end of an inertial sensing mass located within the safing sensor. The first end comprises a material having known reflectivity. The inertial sensing mass moves from a first position to a second position within the sensor in response to an acceleration force. Movement of the inertial sensing mass from the first position to the second position is detected based on a measured intensity level of the light reflectively scattered by the first end of the inertial sensing mass. Detection of the inertial sensing mass movement generates information representative of instantaneous vehicle acceleration.

BRIEF DESCRIPTION OF THE DRAWINGS

FIG. 5 is a schematic illustration of a fourth embodiment for detecting the occupant position based on the second and third embodiments shown in FIGS. 3a–3c and FIGS. 4a–4c;

FIGS. 6a and 6b illustrate plots of occupant position data over time for irrelevant occupant movement and for occupant movement responsive to a vehicle crash, respectively;

DETAILED DESCRIPTION OF THE PREFERRED EMBODIMENT(S)

Figure 1:
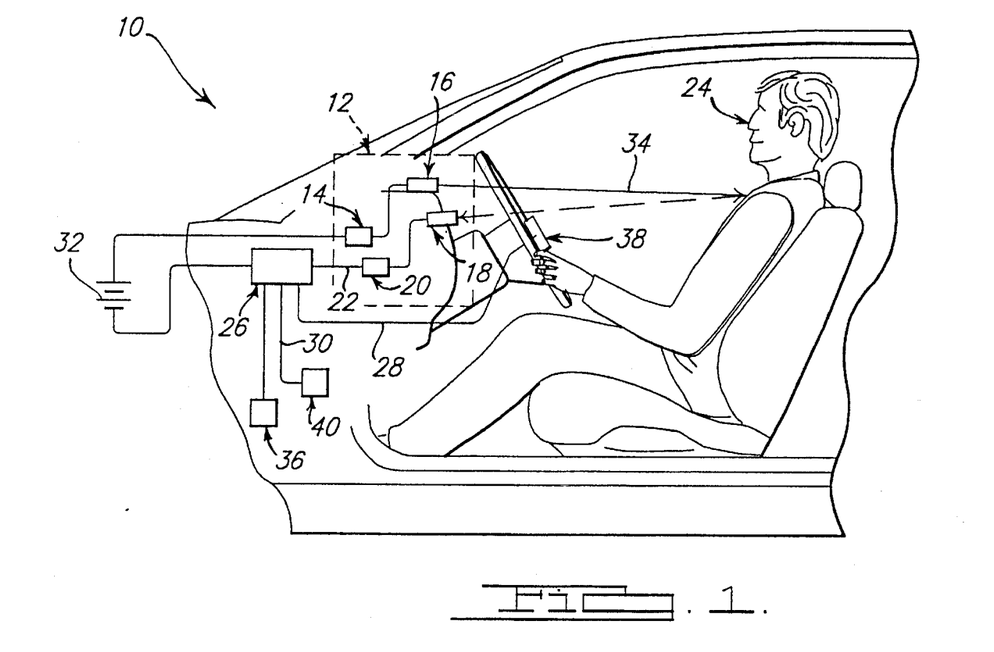
FIG. 1 is a schematic illustration of motor vehicle crash discrimination system having an occupant position detector in accordance with the present invention.

Referring to FIG. 1, there is shown a vehicle crash basic occupant condition discrimination system 10 in accordance with the present invention which senses various occupant conditions and thereafter selects the optimal one of a plurality of predetermined crash discrimination "strategies" for use in triggering a vehicle occupant safety restraint, such as an air bag 38, based upon sensed occupant conditions. Specifically, the system 10 comprises an active infrared position detector 12 comprising a modulator 14 connected to an optical transmitter 16, and an optical receiver 18 connected to a synchronous demodulator 20. The demodulator 20 generates an output 22 indicative of the distance between an occupant 24 and a potential impact point within the vehicle. The output 22 is supplied to a signal processor/discrimination unit 26 for storage in a memory 36, and for subsequent use as a basis for selecting the temporally most appropriate or "optimal" one of a plurality of predetermined crash discrimination strategies. The output 22 preferably further forms the basis for at least one decisional criterion or "parameter" used by at least one of the available crash discrimination strategies.

Specifically, in response to analysis of the detected distance between the occupant and a fixed interior structure of the vehicle, the processor/discrimination unit 26 generates occupant condition data, such as transitory values for occupant position and occupant velocity, with which to further select the optimal crash discrimination strategy to be used in controlling deployment of the air bag 38, as communicated to the safety restraints via at least one output line 28; and/or to control activation of an audible or visual warning device(s) 40 via at least one output line 30 for alerting the vehicle occupant 24 to a potentially hazardous seating condition. The infrared position detector 12 and the signal processor 26 receive power from a vehicle battery 32.

The system 10 is fixedly mounted on and/or in the vehicle steering column or dashboard. Thus, in a crash, the fixedly-mounted portions of the present system 10 will experience essentially the same decelerations as a conventional accelerometer. However, an occupant's motion or reaction to a crash will be somewhat different from the motions of the structures upon which the accelerometer is mounted, since the vehicle occupants are not rigidly affixed to any cabin structure. Accordingly, the pattern of relative motions of the mounting structures and the vehicle occupant(s) is used by the present system and method as a primary input for selecting the optimal one of the available predetermined crash discrimination strategies providing the decisional criteria with which to analyze a crash, and as a secondary input to at least one of the strategies as a crash discrimination criterion (or to form the basis from which another criterion is derived).

Accordingly, under the present invention, the system 10 measures the distance of the occupants relative to the fixed structure within the vehicle and generates transitory values for occupant position and velocity therefrom. As will be described more fully hereinbelow, advanced signal processing techniques performed in the processor/discrimination unit 26 will allow identification of those situations where deployment of a safety restraint is required. Through analysis of dynamic occupant conditions such as transitory occupant velocity (as generated from changes in the detected distance to the occupant over time), the system 10 is further able to recognize or identify occupant motion characteristic of seat belt usage and to distinguish this type of motion from occupant motion where no seat belt is being used. Such occupant motion recognition/identification also enables the present system 10 to distinguish "irrelevant" or otherwise inconsequential occupant motions such as a hand or arm moving through the incident beam.

The reaction of the vehicle as derived from accelerometer data preferably still forms the basis for at least one decisional criterion found in each of the available crash discrimination strategies. However, as noted above, the detected occupant distance and/or the occupant condition data generated therefrom are preferably also used as decisional criterion in one or more of the available crash discrimination strategies.

In operation, a narrow infrared beam 34 is directed horizontally at the expected position of the driver or passenger. At least a portion of the light energy scattered by the occupant's clothing is detected by receiver 18, which is located away from the beam axis so that the receiver 18 can detect differences in reflected light intensity and angle associated with occupant absence, presence and forward motion. The infrared beam 34 is distinguished from ambient light of the same wavelength by modulating the signal 34. A modulation frequency of about 10 Khz or higher provides acceptable modulation since a minimum of 10 Khz is well within the range of most existing electronic and optical systems, and is fast enough to monitor passenger movement in real time. Determination of the instantaneous distance of the occupant from the transmitter 16 is based on the relative intensity of the light scattered by the occupant as measured by a detector or detectors, with measurements based on relative intensity or the angle from which the light is received.

Figures 2, 3:
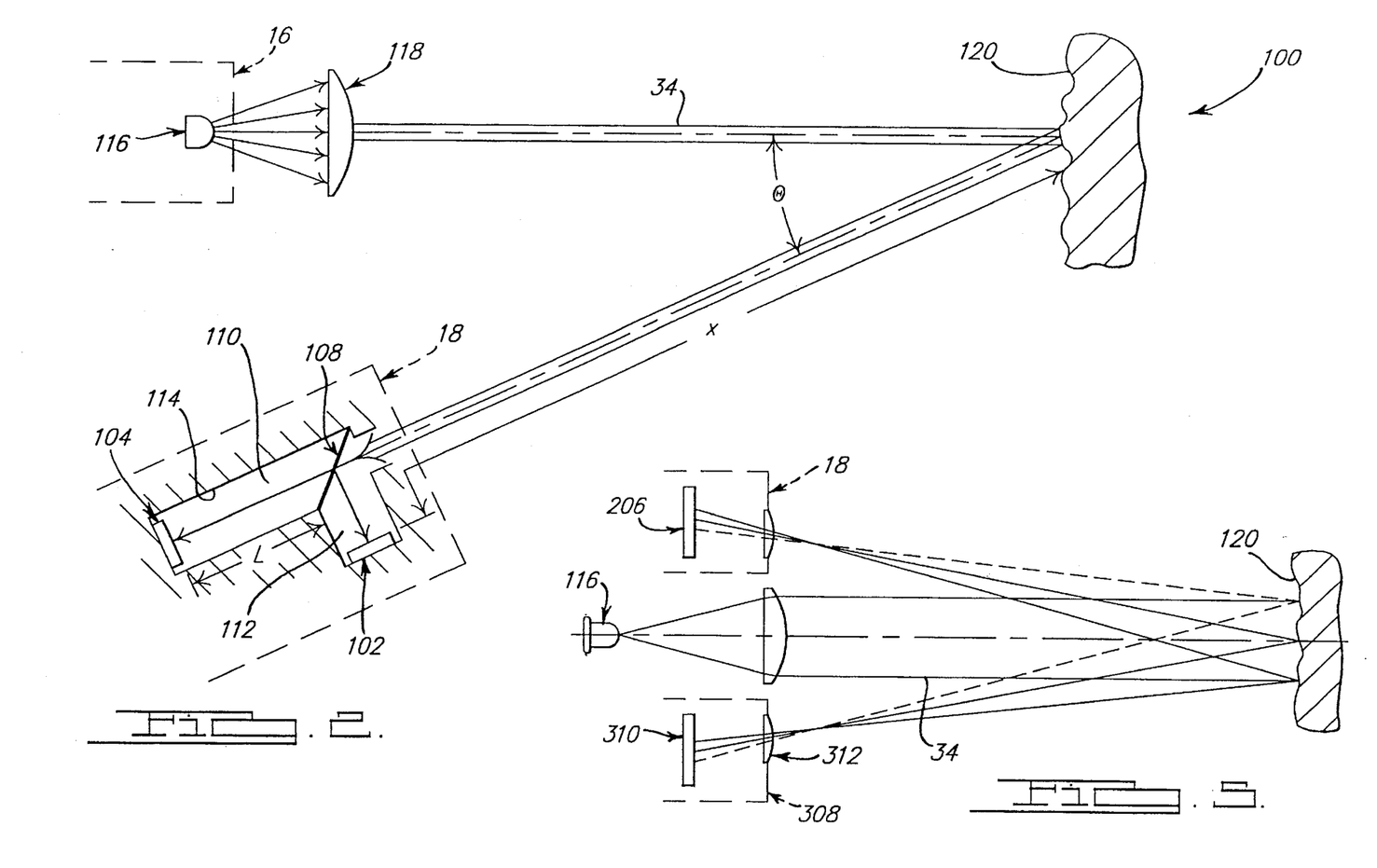
FIG. 2 is a schematic illustration of a first embodiment for detecting the occupant position.
Figure 2A:
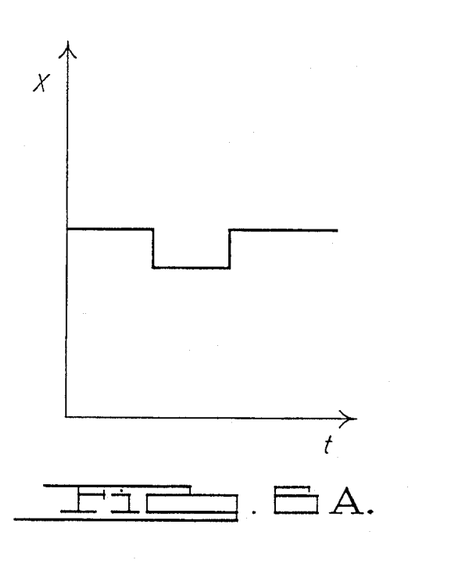
Figure 2B:
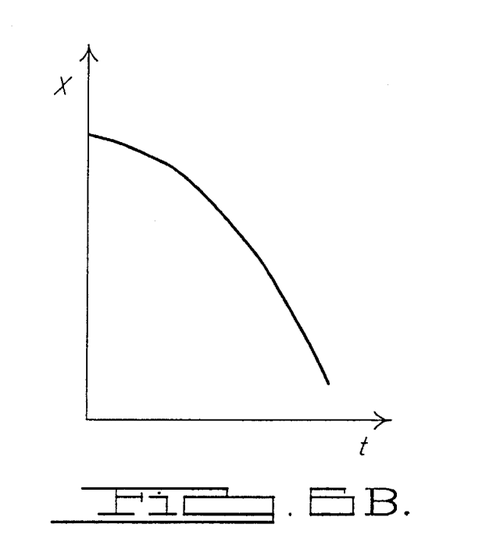

Referring to FIG. 2, a first embodiment 100 of a transducer for detecting the relative distance of an occupant employs the principle that the intensity of scattered light is inversely proportional to the square of the distance r from scattering surface to the receiver 18. In the first embodiment 100, the receiver 18 comprises a pair of photodiode detectors 102 and 104 situated a known distance apart and placed at different distances from the point where the incident light is reflectively scattered. The receiver 18 is preferably positioned relative to the transmitter 16 so as to produce a relatively small angle θ between the transmitted beam 34 and the portion of the reflected beam impinging upon the receiver 18. In order to insure that the two photodiode detectors 102 and 104 are sensing light scattered from the same area, a beam splitter 108 will be used to direct half of the reflectively scattered light to one photodiode, and half to the other. The use of a beam splitter also serves to eliminate any angular variations within the plane of incidence. This helps to insure that the difference in distance is the only factor that affects the relative intensities of the light received by the photodiodes.

The structure of receiver 18 further comprises light passages 110 and 112 having light absorbing walls 114 for coupling the beam splitter 108 with detectors 102 and 104. The light absorbing walls 114 may further include baffling to further reduce light reflected to the detectors 102 and 104. The incident light beam 34 can be generated by a light emitting diode or semiconductor laser 116 located within the transmitter 16, with the generated light being subsequently collimated by a lens 118 to produce a light beam 34 that maintains a constant diameter of approximately one inch over a distance of 6 to 30 inches. The collimated beam 34 is then scattered in all directions by a reflecting surface 120, i.e., the vehicle occupant 24 if present.

Suppose that the distance between detectors 102 and 104 is L, and the distance from the point of reflective scattering to the closest photodiode 102 is x. Under the principle of $1/r^2$, the intensity of the scattered light at the closer detector 102 is proportional to $1/x^2$, and the intensity of the scattered light at the other detector 104 is proportional to $1/(x+L)^2$.

If the field of view is the same for both detectors, then:

$$\frac{I_1}{I_2} = \frac{(x+L)^2}{x^2} \rightarrow x = \frac{L}{\left[\left(\frac{I_1}{I_2}\right)^{0.5} - 1\right]}$$

Thus, the ratio of the intensities sensed by the two photodiodes 102 and 104 serves as a measure of the distance x to the vehicle occupant.

It is noted that the $1/r^2$ relationship holds true only for light that is randomly scattered from an object. The intensity of light that is specularly reflected does not diminish as a function of distance in the same way as scattered light. Fortunately, the specularly reflected light can be screened out by using polarizers. Since specularly reflected light tends to retain the polarization of the incident light, the incident light can be polarized in a particular direction, e.g., vertical, and the reflectively scattered light can be polarized in the complementary direction (horizontal). Because the reflectively scattered light is randomly polarized, polarization of the scattered light should permit about half of the light intensity to reach the detectors 102 and 104.

Figure 3A:
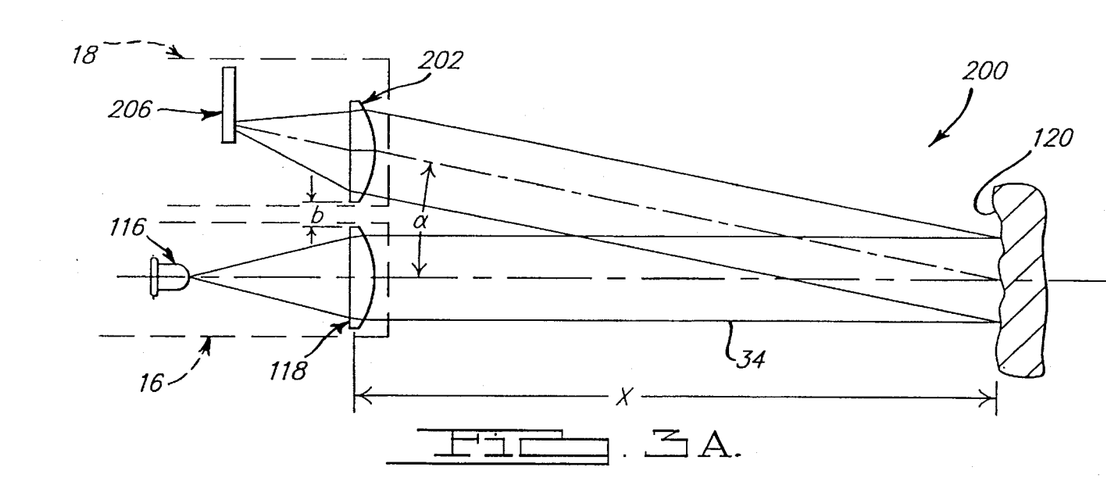
FIGS. 3a, 3b and 3c are schematic illustrations of a second embodiment for detecting the occupant position.
Figure 3B:
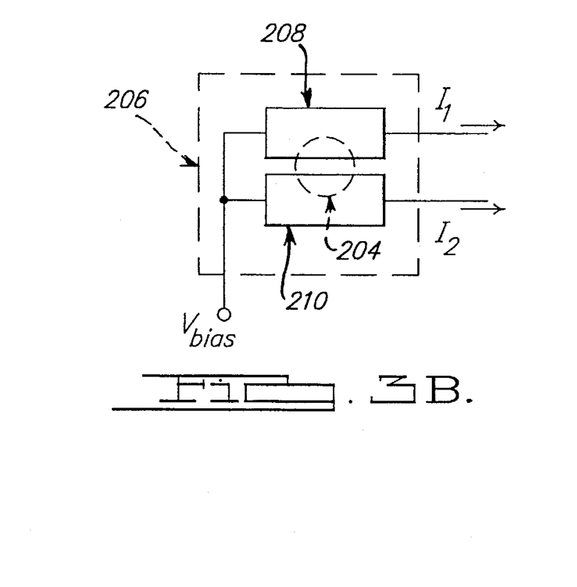
Figure 3C:
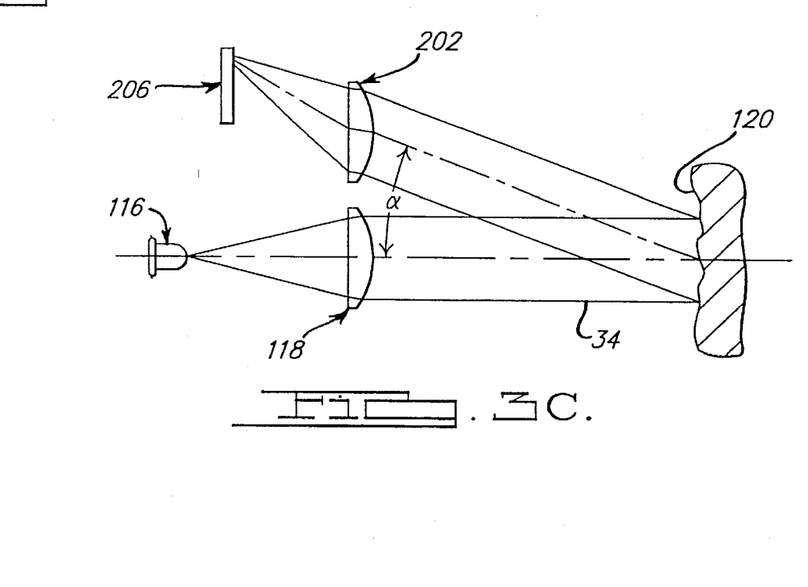

Referring to FIGS. 3a–c, there is shown a second embodiment 200 for determining the position of an occupant based on triangulation of the received light intensity. Elements previously described have like reference numbers. More specifically, the collimated beam 34 which is scattered in all directions by the reflecting surface 120, i.e., the occupant, is focused by an imaging lens 202 to form a relatively small spot 204 on a Bi-cell detector 206. As shown in FIG. 3b, the Bi-cell detector 206 comprises a pair of adjacent photodiode detectors 208 and 210. Since the lens 202 aperture selects the fraction of the scattered light that reaches the detector 206, the spot 204 on the detector moves when the angle α between the axis of beam 34 and the axis of the reflectively scattered light reaching the detector changes, as shown in FIG. 3c.

The direction of the reflected rays reaching the photodiode detectors 208 and 210 is determined by the positions of the center of the imaging lens 202 and the point where the reflecting surface 120 cuts the incident beam 32. Thus, the particular angle α at which light is received at the photodiodes 208 and 210 depends only on the distance x to the reflecting surface. This angle is determined by $\tan \alpha = b/x$, where x is the distance from the source to the reflecting surface, and b is a predetermined lateral separation of the transmitter and the detector. As the angle α varies, the relative amounts of radiant flux received by the two diodes 208 and 210 also varies. The diodes 208 and 210 generate respective current outputs $I_1$ and $I_2$ proportional to the relative amounts of light received by the diodes. Signal processing of the detector output currents preferably includes the step of calculating the amplitude-independent ratio of currents to correct for reflection variation at the scattering surface 120. The ratio of the relative intensities determines the location of the spot 204 to provide a good measure of the angle α and, hence, of the distance x to the reflecting surface 120.

Figure 4A:
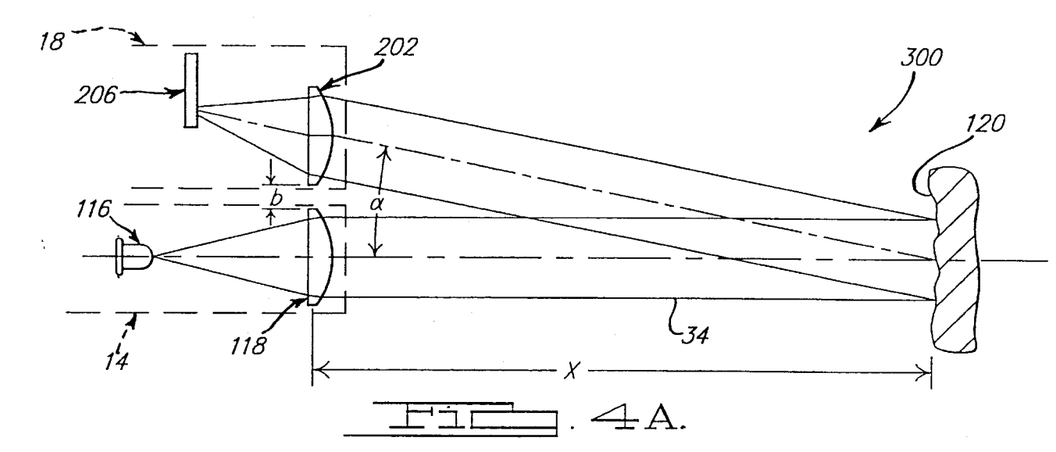
FIGS. 4a, 4b and 4c are schematic illustrations of a third embodiment for detecting the occupant position.
Figure 4B:
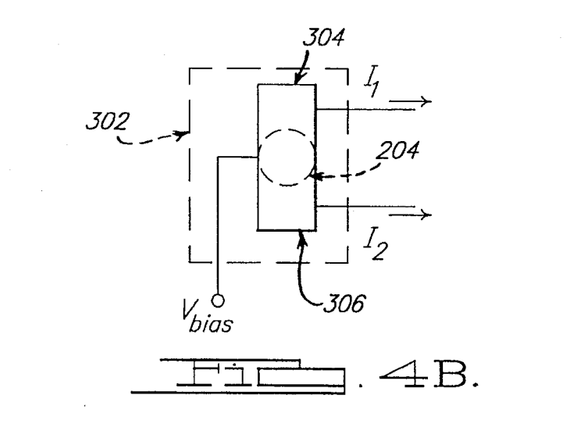
Figure 4C:
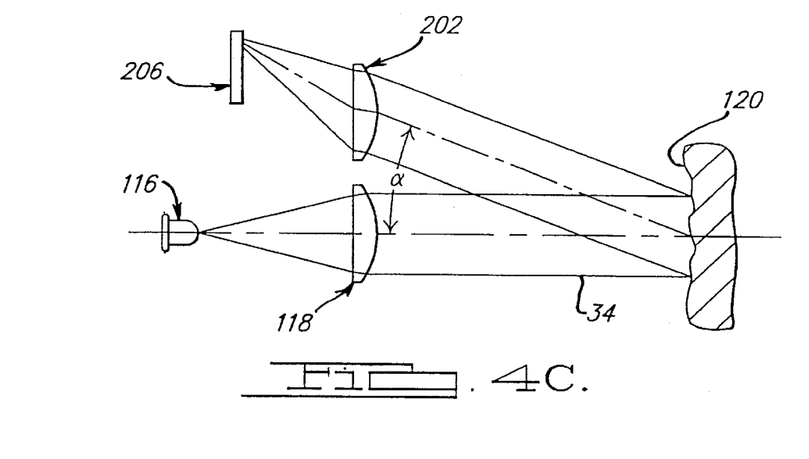

Referring to FIGS. 4a–c, there is shown a third embodiment 300 for determining the position of an occupant which employs triangulation of the received light intensity similar to embodiment 200, but which replaces the Bi-cell detector 206 with a position sensitive detector (PSD) 302. The PSD 302, as shown in FIG. 4b, is a distributed photosensitive device for which the contrast ratio $(I_1-I_2)/(I_1+I_2)$ in output currents $I_1$ and $I_2$ from the top and bottom ends 304 and 306 provides a linear measure of the spot's vertical position. As shown in FIG. 4c, when the angle α varies, the position at which the reflected light is imaged will vary across the PSD 302. The ratio of the two current outputs $I_1$ and $I_2$ varies as the center of light intensity moves across the PSD 302 and, therefore, provides a measure of the angle α. The distance x to the occupant 24 can then be determined in a like manner as embodiment 200, described hereinabove.

As shown in FIG. 5, a second receiver 308 having a Bi-cell detector or PSD 310, and a imaging lens 312, can be located on the opposite side of the collimated incident beam 34 from the first Bi-cell detector 206, or PSD 302. The arrangement shown in FIG. 5 can provide a more accurate detection of the occupant's position because the use of the additional receiver 308 located on the opposite side of the incident beam 34 compensates for shifts in the scattering angle caused by variations in reflectivity across the incident beam. More specifically, variations in reflectivity of the reflecting surface shift the center of the reflectively scattered light beam from the geometric center of the light beam. The shift in the center point can change the angle of the received light beam. The use of two separate receivers located on opposite sides of the incident beam allows the system 10 to make an accurate determination of distance despite any shifts in the center of the reflectively scattered light beam.

In accordance with the present invention, the present system 10 uses the occupant distance information provided by the optical position detector 12 in several ways: for selecting the optimal crash discrimination strategy, as a decisional criterion within one or more strategies, and/or for adjusting other decisional criteria (e.g., thresholds) used to evaluate other decisional parameters in one or more strategies. Specifically, the occupant distance information provided by optical position detector 12 can be stored and subsequently tracked relative to the fixed vehicle interior structure by the signal processor 26 to generate data which approximates such actual occupant conditions as occupant presence, occupant velocity (change in occupant distance over a period of time), occupant acceleration (change in occupant velocity over a period of time), and various occupant seating conditions, e.g., distance from potential impacts points such as the steering wheel or dashboard, occupant in a potentially dangerous position relative to the potential impact points, and occupant use of a seat belt. For example, the latter determination seat-belt use can be reliably predicted under the present invention based on the pattern of occupant motion, i.e., analysis of the transitory occupant position and velocity.

Also, since the processor 26 stores and tracks the position information with respect to time, irrelevant occupant movements, such as hand waving, arm movement, etc., can be differentiated from movement caused by a crash situation. This is illustrated in FIG. 6a, which shows a plot of occupant position-versus-time data representative of an arm waving, and FIG. 6b, which shows a plot of data representing an occupant during a crash situation. Therefore, with the present invention, the vehicle crash discrimination system 10 is designed to provide high frequency measurements of the position of the driver and/or passengers relative to potential impact points such as the steering wheel and dashboard, and to process that information so as to optimize the safety restraint deployment decision. The system can therefore refrain from deploying an air bag when an occupant is too close, where the explosive force with which an air bag is inflated might otherwise do substantial harm. Thus, the present invention can prevent injuries by refraining from deploying the air bag. The further alternative of adjusting the resulting air bag inflation profile, for example, upon or subsequent to determination of an actual time to fire using the multiple strategy system and method of the present invention, is taught in U.S. patent application Ser. No. filed Jan. 14, 1994, and entitled "Variable Inflation System For Vehicle Safety Restraint," the teachings of which are hereby incorporated by reference.

The system 10 also measures the actual transitory position, velocity, and acceleration of the occupants relative to the potential impact points within the vehicle, and, using these measurements in conjunction with advanced signal processing techniques, the present invention greatly increases the amount of information useful in the deployment decision. The present invention also significantly improves the crash discrimination analysis by supplying vehicle occupant position information which can be used in real time to adjust decisional criteria through continuous selection of the optimal crash discrimination strategy in real time, with their differing ranges of actual times to fire. The on-going ability to switch between available discrimination strategies in response to changing occupant conditions allows the present system 10 to transitorily customize the decisional criteria used for triggering deployment of the air bag 38 and, hence, maximize occupant protection notwithstanding those changing conditions.

Figure 8:
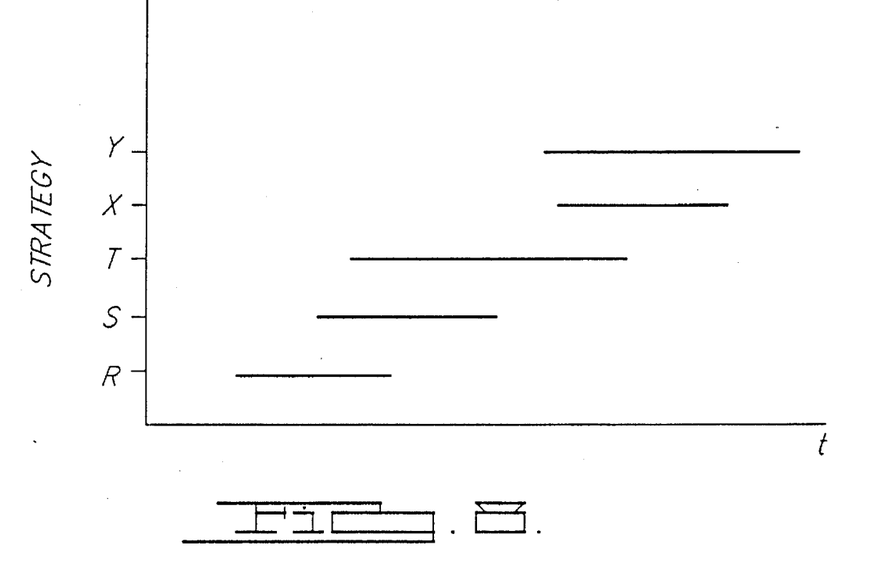
FIG. 8 is a plot of Strategy versus Time illustrating the range of actual times to fire provided by exemplary discrete crash discrimination strategies R, S, T, X and Y, as might be obtained where each strategy employs uniquely-different parameter-based algorithms in determining an actual time to fire.
Figure 9:
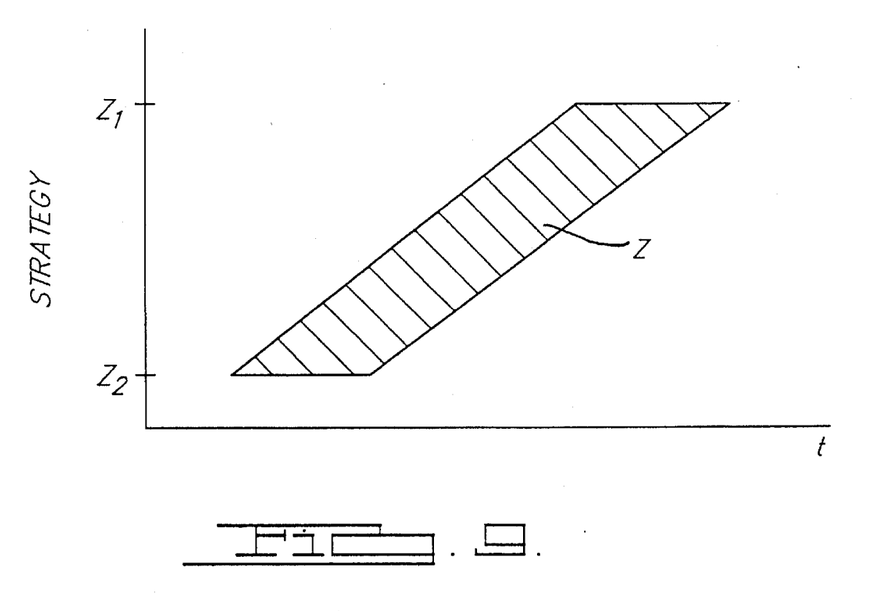
FIG. 9 is a plot of Strategy versus Time illustrating the ranges of actual times to fire provided by exemplary crash discrimination strategy Z, which employs a critical decisional threshold which varies as a function of the detected distance between the occupant and a fixed structure within the vehicle.

Further, by selecting between the different available crash discrimination strategies, each with their individualized decisional criteria and available range of actual times to fire, the crash discrimination analysis is effectively adjusted in light of actual occupant conditions to improve the efficiency of the discrimination analysis and the reliability of any necessary actuation of the safety restraint. The effect of strategy selection on actual times to fire under each of the two "approaches" for providing multiple crash discrimination strategies is shown in FIGS. 8 and 9, respectively. Specifically, FIG. 8 is a plot of Strategy versus Time illustrating the range of actual times to fire provided by exemplary discrete crash discrimination strategies R, S, T, X and Z, as might be obtained where each strategy employs a uniquely-different parameter-based algorithm in determining an actual time to fire. That each given parameter-based crash discrimination strategy inherently provides a range of actual times to fire may be seen from the following simplified example: assuming a crash discrimination strategy which determines a need to actuate an air bag at an actual time to fire $TTF_1$ if a velocity term derived from vehicle acceleration data exceeds a fixed 14 mph threshold value, the actual time to fire $TTF_1$ nonetheless remains dependent upon the amount of time it takes for the velocity term to exceed the 14 mph threshold. Since the velocity (integrated acceleration) term will accumulate faster in a relatively severe crash, with its higher individual transitory acceleration values, the actual time to fire $TTF_1$ in a relatively severe crash will occur at an earlier absolute time, as measured from the beginning of the crash. In contrast, in a relatively moderate (but still significant) crash, the velocity term will accumulate more slowly, with its relatively lower individual values for transitory vehicle acceleration, with the resulting actual time to fire $TTF_1$ occurring at a later absolute time relative to the beginning of the crash. Stated another way, an acceleration-based crash discrimination algorithm typically provides a range for actual times to fire, with any given set of acceleration data (which may itself loosely be said to define a crash type) resulting in generation of a trigger signal at an actual time to fire within that provided range of actual times to fire.

FIG. 9 is a plot of Strategy versus Time illustrating the ranges of actual times to fire provided by exemplary crash discrimination strategy Z, which employs a critical decisional threshold which varies as a function of the detected distance between the occupant and a fixed structure within the vehicle. The resultant "band" shown in FIG. 9 may be appreciated as an infinite number of discrete strategies located between two constructive "boundary" strategies $Z_1$ and $Z_2$, each providing their corresponding range of actual times to fire.

The above concepts may be further understood in light of the following examples: in a first exemplary situation, wherein a vehicle occupant wearing a seat belt experiences a marginally-low-velocity crash, occupant position and occupant motion is analyzed in real time to conclude that the occupant is indeed wearing a seat belt. Since the seat belt prevents the occupant from striking any interior structures within the vehicle with injury-causing force, deployment of the air bag in this situation is unnecessary and undesired. Accordingly, as the degree of confidence in the determination of seat-belt usage increases (e.g., given an essentially static occupant condition), the selected strategy will have an increasingly high range of actual times to fire, to the point that an actual time to fire with which to deploy the air bag will not be determined, from a practical perspective. Stated another way, the selected crash discrimination strategy would likely feature heightened threshold values when the system 10 detects an occupant condition indicative of seat-belt usage, thereby providing a range of relatively longer (up to infinity) actual times to fire. This, in contrast with prior art systems, which typically do not receive any information concerning the actual motion of the occupant (or lack thereof), whereupon the system must make a "worst-case" assumption, i.e., no seat belt usage, and deploy the air bag.

In a second situation, a driver has assumed a position within the vehicle which is closer to the steering wheel than the "nominal position" which would be assumed by a 50th-percentile male occupant but is otherwise outside the air bag's inflation zone. The resulting required time to fire—the amount of time available within which to trigger deployment of the air bag before the driver enters the inflation zone—is less than the "nominal" required time to fire for such a 50th-percentile male occupant sitting in the nominal position. By measuring the actual distance to the driver and generating occupant condition data therefrom, the present invention selects the crash discrimination strategy which provides a range of actual times to fire likely to result in earlier deployment of the air bag and, hence, prevent the driver from hitting the steering wheel and/or prevent injury to the driver which might otherwise occur when inflating the air bag. Stated another way, the selected crash discrimination strategy would likely feature reduced threshold values when the system 10 detects an occupant condition wherein the driver is sitting closer than the otherwise-assumed nominal or "average" distance from the steering wheel, thereby providing a range of relatively shorter actual times to fire.

In a third situation, a driver is sitting at a somewhat-greater-than-average distance from the steering wheel. Since the driver can then move a greater distance in response to a vehicle collision before striking any potential impact point within the vehicle, with the attendant increase in the amount of time between the commencement of a crash and any such impact, the required time to fire is correlatively lengthened, thereby providing additional time and data for use in crash discrimination analysis. The ability to analyze more information over a longer period of time in turn provides a more reliable discrimination analysis. Accordingly, under the present invention, where an increased distance is detected between the driver and the potential impact point within the vehicle, the resulting occupant condition data generated from the detected distance is used to select the crash discrimination strategy which provides a range of actual times to fire likely to result in later deployment of the air bag, perhaps through use of a more "statistically robust" but time-consuming crash discrimination algorithm. Stated another way, the selected crash discrimination strategy would likely feature increased threshold values relative to those employed when the driver is seated the otherwise-assumed nominal or "average" distance from the steering wheel, thereby providing a range of relatively longer actual times to fire.

Figure 7:
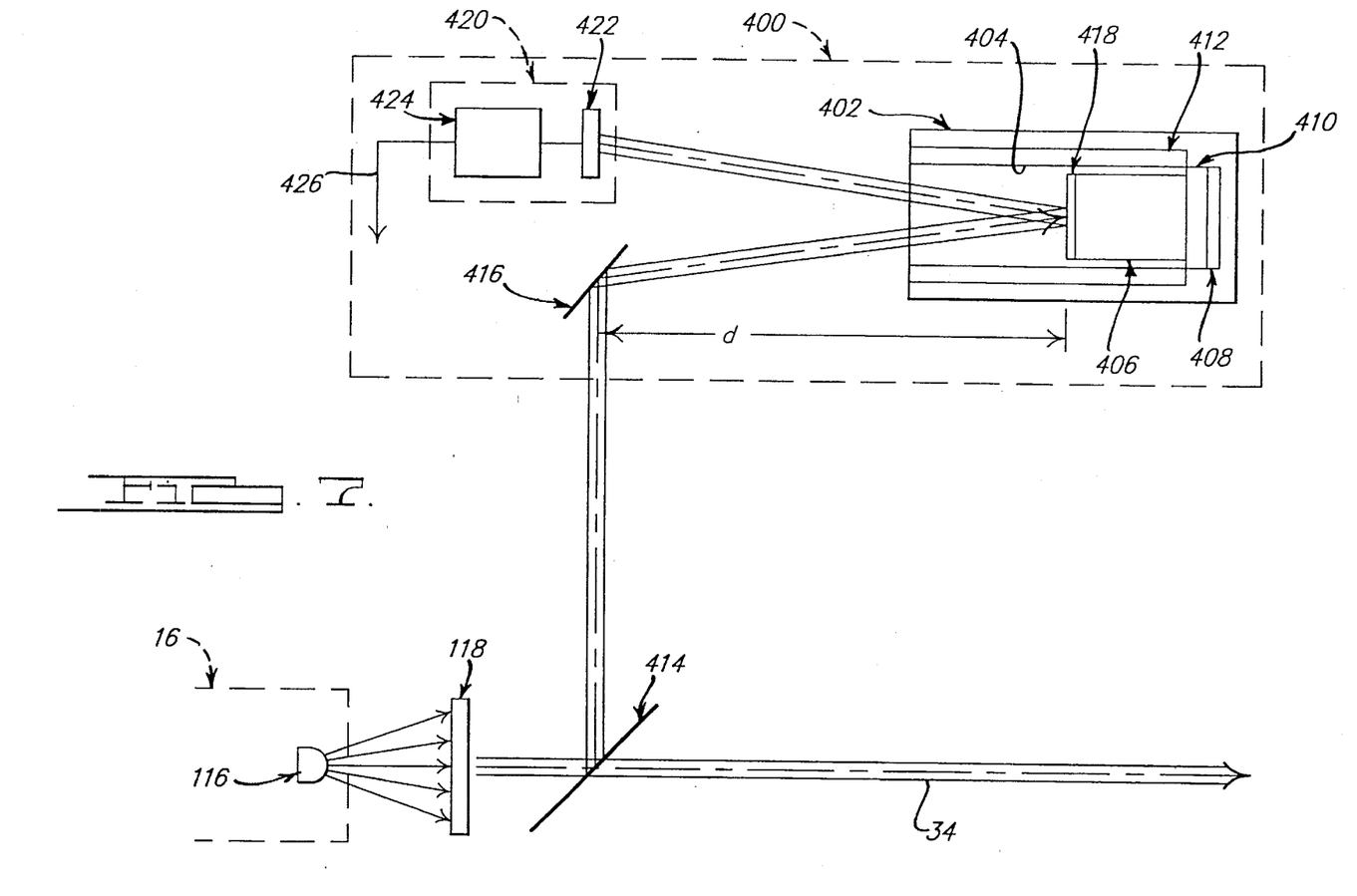
FIG. 7 is a schematic illustration of a further embodiment of the vehicle crash discrimination system having an optical low threshold safing sensor.

FIG. 7 shows a further embodiment of the passenger condition discrimination system 10 of the present invention incorporating a supplemental optical, low-threshold safing sensor 400. The safing sensor 400 comprises a housing 402 having a cylindrical passage 404 formed therein, and a magnetic sensing mass 402 in the passage 404 which is magnetically biased by a magnetically permeable element 408 to an initial position against a stop element 410 located at a first end within the passage 404. The sensing mass 406 is displaced in response to acceleration of the housing 402 from the initial position to a second position within the passage when such acceleration overcomes the magnetic bias on the sensing mass. Damping means such as an electrically conductive ring 412, for example a copper tube, encompasses the passage 404 to provide magnetic damping for the sensing mass 406 during the displacement of the magnetic sensing mass within the passage 404. The magnetic sensing mass 406 of safing sensor 400 functions in a manner similar to the magnetically-damped, testable accelerometer as taught in commonly assigned U.S. Pat. No. 4,872,901 to Behr, incorporated herein by reference.

As shown in FIG. 7, a portion of the collimated incident beam 34 is supplied by suitable optical coupling structure such as a beam splitter 414 and mirror 416, or alternatively a fiber optic cable, to a second end of the passage 404. The collimated incident beam is horizontally redirected down the passage 404 where the beam is reflectively scattered by a scattering surface 418 of known reflectivity, e.g., cloth, affixed to an end face of the sensing mass 406. A receiver 420 comprising an infrared detector 422 and synchronous demodulator 424 is positioned relative to second end of the passage 404 so as to receive at least a portion of the reflectivity scattered light. The distance d of the sensing mass 406 relative to the fixed incident light source can be calculated by detecting the intensity of the scattered light as described hereinabove with respect to FIGS. 2–4. The data obtained by the synchronous demodulator 424 is provided as an output 426 to the signal processor/discrimination unit 26 for storage and/or analysis.

The safing sensor 400 of the present invention provides several advantageous functions for the present vehicle crash discrimination system 10. First, the safing sensor 400 provides a way of calibrating the system 10. The intensity of the light scattered by the sensing mass 406 while at the initial position will be substantially constant, thereby allowing corrections or adjustments to the transmission of the incident light beam 34. Further, since the scattering surface 418 affixed to the end of the sensing mass 406 has a known reflectivity, the system 10 will be able to detect a condition where an occupant is providing a low reflection of the incident beam 34, such as an occupant wearing a material of low reflectivity like black velvet, based on a comparison of the respective outputs 22 and 426. Thus, the system 10 can make appropriate corrections for the occupant's low reflectivity.

Second, the safing sensor 400 supplements the signal processor/discrimination unit 26 in discerning irrelevant occupant movement, such as a hand-waving in front of the receiver 18. The signal processor 26 may detect movement of the occupant because of the data generated by receiver 18. However, if the sensing mass 406 in the safing sensor 400 does not move, the signal processor 26 can assume that the occupant movement was not in response to vehicle acceleration.

Third, the safing sensor 400 provides additional data for use in the discrimination analysis since the data generated at output 426 in response to the movement of the sensing mass 406 can be differentiated twice with respect to time to determine vehicle acceleration. Vehicle acceleration data can then be utilized with the occupant condition/position data in the selected strategy's parameter-based algorithm to provide more reliable crash discrimination and safety restraint actuation.

Preferably, the distance measurement of the sensing mass 406 movement should be based on how a frictionless sensing mass would react to vehicle acceleration. However, as described hereinabove, the safing sensor 400 employs both biasing and damping of the sensing mass 406 to permit the sensor 400 to be unaffected by conditions such as very-low-threshold crashes and rough-road conditions. The biasing and damping of the sensing mass 406 provides inexact motion measurement data for signal processor unit 26. The effects of the biasing and damping on the sensing mass movement are well understood, and, therefore, in the present invention, the signal processor unit 26 preferably modifies the data from output 426 with a factor which effectively "undamps" the data before use in the discrimination analysis. Thus, a movement measurement based on a "frictionless" sensing mass is obtainable with the above-described safing sensor 400.

While the preferred embodiments have been described using an active infrared position detector 12, it will be appreciated that an acceptable alternative active or passive sensing arrangement utilizing ultrasonic sensors or microwave sensors could be employed. It will be further understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

We claim:

1. A system for actuating a vehicle safety restraint comprising:

means for detecting a distance between a vehicle occupant and a fixed structure within the vehicle;

means for receiving information representative of instantaneous vehicle acceleration;

processor means responsive to said detected distance and said received vehicle acceleration information for determining a first actual time to fire, wherein said processor means generates occupant condition data based on said detected distance, said occupant condition data being representative of at least one of the group consisting of transitory occupant position, transitory occupant velocity and transitory occupant acceleration; and wherein said processor means selects in real time one of a plurality of crash discrimination strategies for use in a crash discrimination analysis based on said generated occupant condition data, each of said strategies using said received vehicle acceleration information to provide a range of actual times to fire, said range of actual times to fire provided by one of the strategies being different from the range of actual times to fire provided by another of the strategies; and wherein said processor means determines said first actual time to fire in accordance with the selected strategy; and means responsive to said processor means for actuating the safety restraint at said first actual time to fire.

2. The system of claim 1, wherein said processor means further predicts a first required time to fire using said generated occupant condition data; and wherein said first actual time to fire is less than said first required time to fire.

3. The system of claim 1, wherein said generated occupant condition data is used by said processor means in determining said first actual time to fire in accordance with at least one of said strategies.

4. The system of claim 1, wherein said processor means compares said generated occupant condition data to a first threshold value in accordance with at least one of said strategies.

5. The system of claim 4, wherein the first threshold varies as a function of said detected distance.

6. The system of claim 1, wherein said processor means compares said detected distance to a second threshold in accordance with at least one of said strategies.

7. The system of claim 1, wherein said processor means compares said vehicle acceleration information to a third threshold value in determining said first actual time to fire in accordance with at least one of said strategies, and wherein the third threshold value varies as a function of said detected distance.

8. A method of actuating a vehicle safety restraint in response to a crash comprising the steps of:

detecting a distance between a vehicle occupant and a fixed structure within the vehicle;

generating occupant condition data based on said detected distance, said generated occupant condition data being representative of at least one of the group consisting of transitory occupant position, transitory occupant velocity and transitory occupant acceleration;

receiving information representative of instantaneous vehicle acceleration;

selecting in real time one of a plurality of crash discrimination strategies for use in a crash discrimination analysis based on said generated occupant condition data, wherein each strategy uses said received vehicle acceleration information to provide a range of actual times to fire, said range of actual times to fire provided by one of the strategies being different from the range of actual times to fire provided by another of the strategies;

determining a first actual time to fire in accordance with the selected strategy; and actuating the safety restraint at said first actual time to fire.

9. The method of claim 8, wherein said selecting step includes the step of determining a first required time to fire using said generated occupant condition data; and wherein said first actual time to fire is less than said first required time to fire.

10. The method of claim 8, wherein at least one of said strategies uses said generated occupant condition data in determining said first actual time to fire.

11. The method of claim 10, wherein the use of at least one of said strategies includes comparing said generated occupant condition data to a first threshold value.

12. The method of claim 11, further including the step of adjusting the first threshold using said detected distance.

13. The method of claim 8, wherein the use of at least one of said strategies includes comparing said detected distance to a second threshold value.

14. The method of claim 8, wherein the use of said vehicle acceleration information includes comparing said vehicle acceleration information to a third threshold value, and adjusting the third threshold value based on said detected distance.

* * * * *